United States Patent [19]

Schott et al.

[11] Patent Number: 4,559,516

[45] Date of Patent: Dec. 17, 1985

[54] HELMET WITH TURN SIGNAL INDICATORS

[75] Inventors: Roger A. Schott, Redford; Lawrence A. Schott, Detroit, both of Mich.

[73] Assignee: Freedom Industries, Inc., Redford, Mich.

[21] Appl. No.: 535,025

[22] Filed: Sep. 23, 1983

Related U.S. Application Data

[63] Continuation-in-part of Ser. No. 342,143, Jan. 25, 1983, abandoned.

[51] Int. Cl.[4] .............................. B60Q 1/34; B62J 3/00
[52] U.S. Cl. ............................................ 340/73; 340/74; 340/79; 340/67; 340/134; 180/282; 200/52 A; 200/61.27; 200/61.52
[58] Field of Search ............... 340/73, 74, 81 R, 81 F, 340/84, 87, 56, 66, 67, 71, 72, 79, 322, 134, 55; 362/72, 71; 200/52 A, 61.12, 61.27, 61.52, 61.83; 180/282

[56] References Cited

U.S. PATENT DOCUMENTS

| | | |
|---|---|---|
| 3,840,853 | 10/1974 | Cukale ................................ 340/134 |
| 3,876,976 | 4/1975 | Cross, Jr. ............................ 340/134 |
| 4,363,022 | 12/1982 | Manacci ............................. 340/134 |

FOREIGN PATENT DOCUMENTS 639512  3/1962  Italy ...................................... 340/87

Primary Examiner—Donnie L. Crosland
Attorney, Agent, or Firm—Barnes, Kisselle, Raisch, Choate, Whittemore & Hulbert

[57] ABSTRACT

A helmet with turn signal indicator for motorcycle riders and like applications includes a pair of lamps respectively disposed on left-hand and right-hand sides of the helmet body, and head tilt switches responsive to momentary tilting of the wearer's head in a given direction for selectively energizing the lamp on the corresponding helmet side. The lamps are driven by flasher holding circuits which may be selectively extinguished by rearward tilting of the wearer's head. Fiber optics extend within the helmet from adjacent the lamps to above the wearer's eyes to indicate operation to the wearer.

10 Claims, 3 Drawing Figures

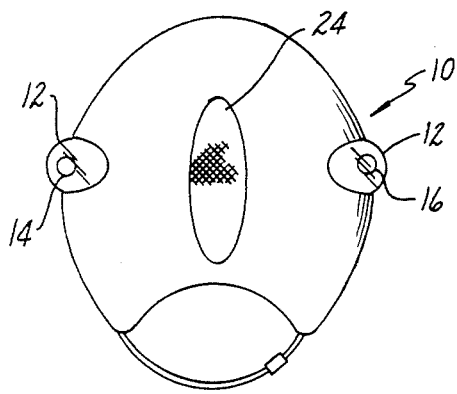
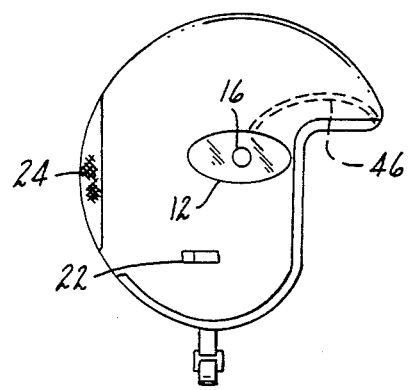
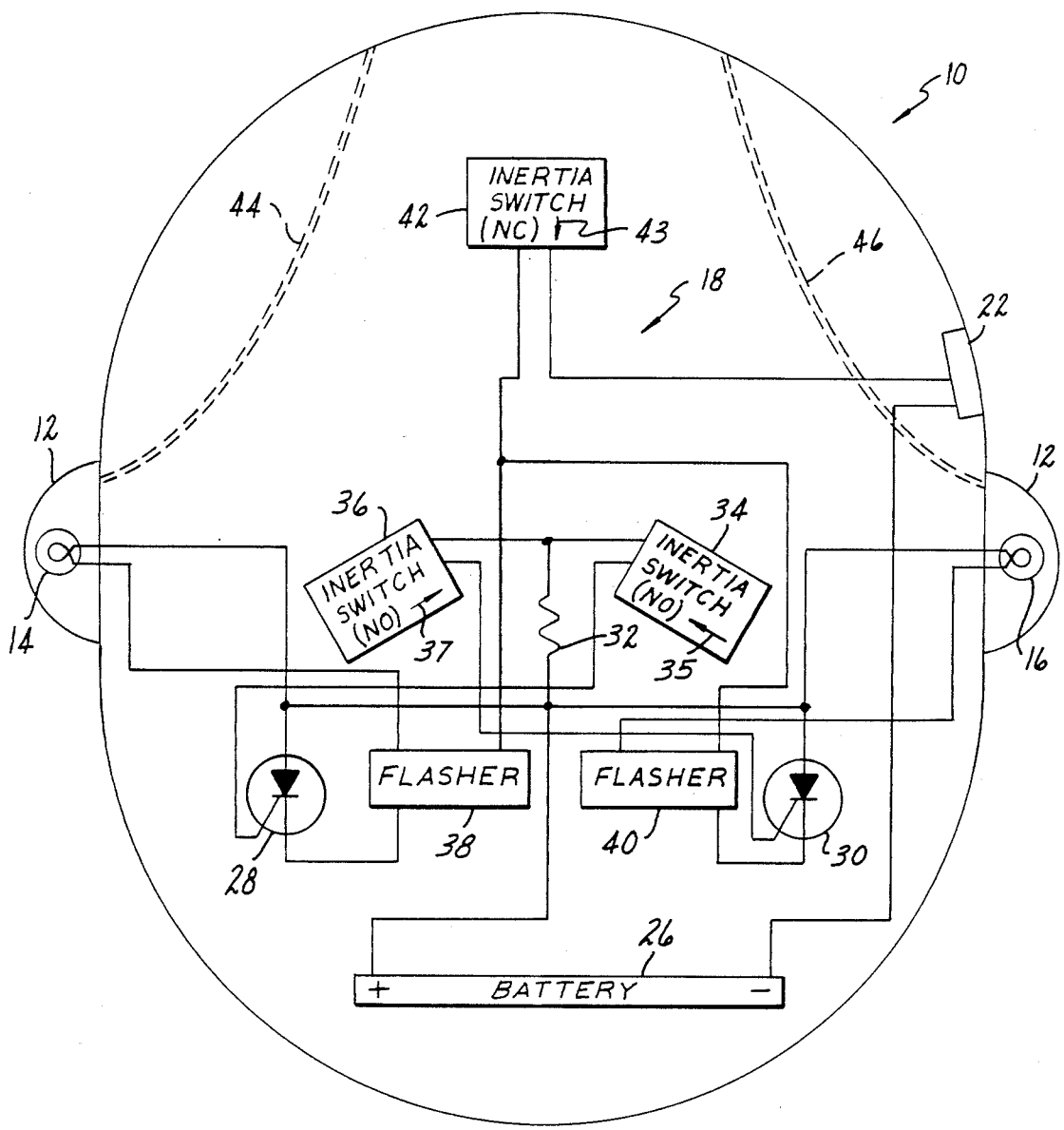

HELMET WITH TURN SIGNAL INDICATORS

This application is a continuation-in-part of application Ser. No. 342,143, filed Jan. 25, 1983 and now abandoned.

The present invention is directed to a helmet for motorcycle riders, snowmobilers and like applications.

Many non-automotive road and off-road recreation-type vehicles are not equipped with turn signal indicators as standard vehicle equipment. Failure of others to appreciate or recognize an intent to turn in either direction, particularly after nighfall, may present a significant safety hazard both to such other persons and to the riders of the vehicle in question. A general object of the present invention is to provide an accessory for use with vehicles of this type whereby the rider may apprise others of an intent to turn in either direction.

More specifically, an object of the present invention is to provide an improved helmet of a type conventionally worn by vehicle riders, which helmet includes turn signal indicator apparatus selectively actuatable by the vehicle rider wearer. In furtherance of the foregoing, another and yet more specific object of the invention is to provide a helmet with turn signal indicator of the described type in which the signal indicators may be actuated and/or deactuated by the wearer without requiring removal of the wearer's hands from the vehicle steering throttle and/or braking mechanism.

A significant feature of the invention lies in provision of a switch arrangement which allows the actuation of the turn signals by the side motion of the head of the wearer and a disconnect by a rearward motion of the head. Another feature lies in the utilization of a holding circuit which is selectively energized and de-energized by the head motion of the helmet wearer. An Italian patent to Pietro, No. 639,512 (Mar. 9, 1962) shows signal elements on a helmet, but these are actuated by hand switches. Published German application DT No. 2,726,322 (Dec. 22, 1977) also shows helmet mounted signals, but these are actuated by signals from a remote radio transmitter. U.S. Pat. No. 3,840,853 (Oct. 8, 1974) shows a body belt carrying signal lights which are illuminated in response to random movements resulting from the involuntary motion of the rider on the cycle as it moves along the course.

Another feature of the invention lies in the positioning of the turn signal lights on the highest extremity of the combined vehicle and passenger. The rider's head is visible in traffic and the turn signals incorporated therein will be far more visible to drivers of following vehicles than would be signals placed on the vehicle itself.

Still another feature of the invention is the provision of turn signal lights which will be visible in a 180° arc, i.e., from rear, side and front.

A further object of the invention is to provide a turn signal indicator system which may be incorporated into helmets at the time of orignal helmet manufacture, or which may be sold as an aftermarket accessory for incorporation into existing helmets.

Another object of the invention is to provide a helmet with turn signal indicator as described which includes a mechanism for simultaneous and continuous flashing actuation of the indicators to function as a hazard warning. Yet another and more specific feature contemplates selective actuation of the hazard warning by action of the wearer's head, and thus without requiring the wearer to remove the hands from the steering mechanism.

The invention, together with additional objects, features and advantages thereof, will be best understood from the following description, the appended claims and the accompanying drawings in which:

FIGS. 1 and 2 are rear and side elevational views of a helmet which incorporates the turn signal indicator mechanism of the invention;

FIG. 3 is a top schematic view of an enlarged scale of the helmet of FIGS. 1 and 2 illustrating the signal actuating and deactuating mechanism.

In accordance with the embodiment of the invention illustrated in the drawings, a generally conventional helmet 10 is equipped on both lateral sides with a translucent lens 12 of red or other suitable color. Internally of helmet 10 beneath lenses 12 are disposed respective lamps 14, 16 on left and right hands of the helmet central plane as viewed from the rearward direction (FIG. 1). Lamps 14, 16 are electrically connected within helmet 10 to a battery-operated electronics package 18 to be described in greater detail in connection with FIG. 3. A slide switch 22 is carried on one side of helmet 10 for enabling activation of the turn signal mechanism. A reflector 24 of white or other suitable color different from lenses 12 is mounted centrally of the rear helmet surface in a position to be viewed by persons following the helmet wearer to enable differentiation from a distance between left and right sides of the helmet.

Turning to FIG. 3, the turn signal indicator electronic package 18 in accordance with the invention includes a battery 26 of any suitable type. The positive terminal of battery 26 is connected to the anodes of a pair of SCR's 28, 30 and to one side of a resistor 32. A pair of normally open inertia switches 34, 36 are connected between the opposing end of resistor 32 and the gate of the respective SCR's 28, 30. Switches 34, 36 are disposed at opposite actuate angles of about 30° with respect to the lateral dimension of helmet 10 and oriented so as to switch from open to closed condition upon inclination of the wearer's head in the opposing forward direction. That is, switch 34 changes from open to closed condition upon inclination of the wearer's head in the left-forward direction 35, and switch 36 closes upon inclination in the right forward direction 37.

The cathode of each SCR 28, 30 is connected to the control input of a corresponding flasher holding circuit 38, 40, which may be of any suitable type. Each signal lamp 14, 16 is connected between the positive terminal of battery 26 and one switching input of the corresponding flasher 38, 40. The second switching inputs of the flashers are connected together through a normally closed inertia switch 42 and through the contacts of slide switch 22 to the negative terminal of battery 26. Inertia switch 42 is disposed to switch from closed to open condition upon tilting of the wearer's head in the rearward direction 43. A pair of optical fibers 44, 46 extend from the respective lamps 14, 16 between the helmet shell and liner to terminate above the wearer's eyes, the left fiber 44 terminating about the left eye and the right fiber 46 terminating above the right eye.

In operation, with switch 22 closed, tilting of the wearer's head in the left-forward direction, for example, momentarily closes switch 34 and fires SCR 28. Flasher holding circuit 38 is thus energized and remains energized to periodically illuminate lamp 14. Flasher 38 and lamp 14 continue to operate as the wearer makes the turn until switch 42 is opened by rearward tilting of the wearer's head or by acceleration of the vehicle after making the turn. Opening of switch 42 interrupts the current path through flasher 38 to the negative terminal of battery 26, thus extinguishing the flasher. Righthand lamp 16 is likewise selectively energized by means of switch 36, SCR 30 and flasher holding circuit 40, and is selectively de-energized by means of switch 42. Fiber optics 44, 46 visibly indicate to the wearer that a lamp is flashing, and thus serve to remind the wearer to extinguish the lamp after a turn is made if the subsequent vehicle acceleration was insufficient to open switch 42.

It will be noted that the respective lamp flashing circuits are not interconnected so as to be mutually exclusive. Thus, a wearer may energize both lamps simultaneously to indicate a hazard condition by tilting the head to the left front and then the right front, or vice versa. Again, the hazard signal will be visible to the wearer through fibers 44, 46, and may be extinguished by switch 42. It will be appreciated that all such selective activation and deactivation do not require removal of the rider's hands from the steering and/or braking mechanism. Switch 22 may be opened when the helmet is not worn to prevent depletion of battery power.

Thus, it will be appreciated in accordance with an important aspect of the present invention that the turn signal mechanism may be activated by momentary tilting of the wearer's head in the desired turn direction without requiring that the wearer's hands leave the vehicle steering, throttle and/or braking mechanism. It will be recognized that the turn signal indicator mechanism in accordance with the invention may be incorporated into helmet 10 at the original helmet manufacture or may be added thereto as an accessory in the aftermarket. Likewise, the invention is not limited to the specific helmet shown in the drawings, but may be embodied in any other typical "crash" helmet. Turn signal on/off switch 22 may be provided other than as slidetype two-position switches as shown in the drawings and may be positioned at any suitably accessible location on the helmet.

It is also contemplated that the helmet may be provided with a suitable jack for recharging of battery 26 when not in use. As previously indicated, the light lenses 12 are so positioned that, when the bulb within is illuminated, the light may be seen from the rear, the front, and the side in a 180° arc. Thus, the signal will be visible to drivers approaching from the front or the side. Furthermore, positioning of the light on the helmet places them at the highest point on the motorcycle for clear observation.

The invention claimed is:

1. In a helmet for motorcycle riders and like applications, a turn signal indicator comprising first and second light emitting means disposed on opposite lateral sides of said helmet, first means including first inertia switch means carried by said helmet so as to be responsive to tilting of a wearer's head to either lateral side to initiate periodic energization of the said light emitting means on the same said lateral side for indicating an intent to turn in the corresponding lateral direction, and second means including second inertia switch means disposed and oriented with said helmet so as to be responsive to tilting of the wearer's head in the rearward direction for terminating said periodic energization.

2. The helmet set forth in claim 1 wherein said first means include flasher holding circuit means responsive to momentary tilting of the wearer's head in either direction and resulting momentary activation of said first inertia switch means for continuing said periodic energization after the wearer's head is returned to vertical orientation.

3. The helmet set forth in claim 2 wherein said flasher holding circuit means includes means for periodically energizing both of said light emitting means in response to tilting of the wearer's head to one side and then the other.

4. The helmet set forth in claim 2 wherein said first inertia switch means includes first and second inertia switches oriented at opposite acute angles to the lateral dimension of said helmet.

5. The helmet set forth in claim 2 further comprising light transmitting means extending through said helmet from adjacent each said light emitting means to a position adapted to be disposed adjacent to the wearer's eyes.

6. The helmet set forth in claim 2 further comprising means carried on and visible from the rear of said helmet to enable an observer from the rear to distinguish between left and right lateral sides of said helmet.

7. In a helmet for motorcycle riders and like applications, a turn signal indicator comprising first and second light emitting means disposed on opposite lateral sides of said helmet, means operable by the wearer of said helmet for selectively energizing and de-energizing said light emitting means, and light transmitting means extending within said helmet from each said light emitting means to a position adapted to be disposed adjacent to the wearer's eyes for indicating to the wearer operation of each said light emitting means.

8. The helmet set forth in claim 7 wherein said light transmitting means comprises first and second optical fibers.

9. In a helmet for motorcycle riders and like applications, a turn signal indicator comprising first and second light emitting means disposed on opposite lateral sides of said helmet, first means including first inertia switch means carried by said helmet so as to be responsive to tilting of a wearer's head in one lateral direction to initiate periodic energization of the said light emitting means on one lateral side of said helmet for indicating an intent to turn in said one lateral direction, and second means including second inertia switch means disposed and oriented within said helmet so as to be responsive to tilting of the wearer's head in a direction other than said one direction for terminating said periodic energization.

10. In a helmet for motorcycle riders and like applications, a turn signal indicator comprising first and second light emitting means disposed on opposite lateral sides of said helmet, first means including first inertia switch means carried by said helmet so as to be responsive to tilting of a wearer's head in one lateral direction to initiate periodic energization of the said light emitting means on one lateral side of said helmet for indicating an intent to turn in the corresponding lateral direction, and second means including second inertia switch means disposed and oriented within said helmet so as to be responsive to tilting of the wearer's head for terminating said periodic energization.

* * * * *

UNITED STATES PATENT AND TRADEMARK OFFICE
CERTIFICATE OF CORRECTION

PATENT NO. : 4,559,516

DATED : December 17, 1985

INVENTOR(S) : Roger A. Schott et al.

It is certified that error appears in the above-identified patent and that said Letters Patent is hereby corrected as shown below:

Column 3, line 63, "with" should read -- within --.

Signed and Sealed this

Twenty-fifth Day of February 1986

[SEAL]

Attest:

DONALD J. QUIGG

Attesting Officer

Commissioner of Patents and Trademarks